United States Patent
Smith et al.

[11] Patent Number: 5,938,422
[45] Date of Patent: Aug. 17, 1999

[54] REMOVAL OF NOXIOUS SUBSTANCES FROM GAS STREAMS

[75] Inventors: James Robert Smith, Blackford; Andrew James Seeley, Clifton, both of United Kingdom

[73] Assignee: The BOC Group plc, Surrey, United Kingdom

[21] Appl. No.: 08/840,326

[22] Filed: Apr. 16, 1997

[30] Foreign Application Priority Data

Apr. 16, 1996 [GB] United Kingdom ............ 9608061

[51] Int. Cl.⁶ ............. F23D 14/00; F23D 3/40; F23B 5/20

[52] U.S. Cl. .......... 431/5; 431/7; 431/8; 431/10; 431/187

[58] Field of Search ............. 431/5, 2, 8, 9, 431/10, 12, 186, 187, 202, 352, 353, 7, 326, 328; 110/345, 346

[56] References Cited

U.S. PATENT DOCUMENTS

| | | | |
|---|---|---|---|
| 3,255,802 | 6/1966 | Browning | 431/9 |
| 3,833,335 | 9/1974 | Lazarre et al. | 431/202 |
| 4,126,419 | 11/1978 | Katabuchi et al. | 431/5 |
| 4,279,208 | 7/1981 | Guillaume et al. | 110/346 |
| 4,751,056 | 6/1988 | Hug et al. | |
| 4,797,087 | 1/1989 | Gitman | 431/10 |
| 4,861,262 | 8/1989 | Gitman et al. | 431/5 |
| 5,097,774 | 3/1992 | Lauwers | 110/346 |
| 5,123,364 | 6/1992 | Gitman et al. | |
| 5,411,395 | 5/1995 | Kobayashi et al. | 431/8 |
| 5,510,093 | 4/1996 | Bartz et al. | 431/5 |
| 5,588,381 | 12/1996 | Jennebach et al. | 110/345 |
| 5,673,553 | 10/1997 | Maese et al. | 431/5 |
| 5,725,367 | 3/1998 | Joshi et al. | 431/8 |
| 5,743,723 | 4/1998 | Iatrides et al. | 431/8 |

FOREIGN PATENT DOCUMENTS

| | | |
|---|---|---|
| 0694 735 | 7/1994 | European Pat. Off. . |
| 0 655 582A1 | 5/1995 | European Pat. Off. . |

Primary Examiner—Ira S. Lazarus
Assistant Examiner—Josiah C. Cooks
Attorney, Agent, or Firm—David M. Rosenblum; Salvatore P. Pace

[57] ABSTRACT

A process for the combustive destruction of noxious substances from a gas stream in which the gas stream and added fuel gas as a mixture into a combustion zone that is surrounded by an exit surface of a foraminous gas burner. A fuel gas and air/oxygen mixture are simultaneously supplied to the foraminous gas burner to effect combustion at the exit surface. The resulting combustion product stream is discharged from the combustion zone. The oxygen is added to the gas stream and the fuel gas prior to the introduction of the mixture to the combustion zone and the oxygen/fuel gas mixture burns at the point of injection.

11 Claims, 1 Drawing Sheet

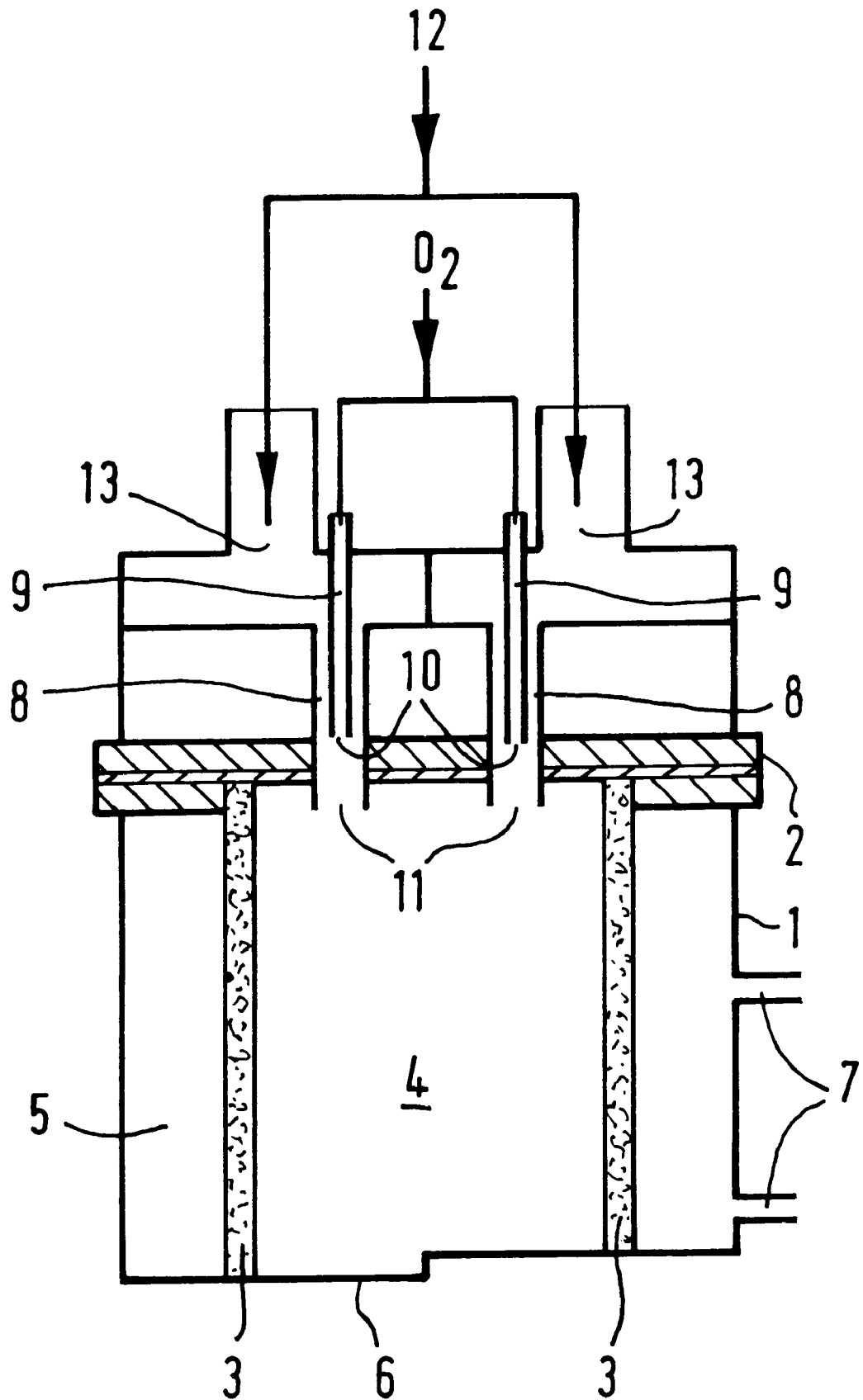

REMOVAL OF NOXIOUS SUBSTANCES FROM GAS STREAMS

BACKGROUND OF THE INVENTION

This invention relates to the removal of noxious substances from gas streams, in particular the removal of very stable fluorocarbons from gas streams emanating from i-conductor processing chambers by means of combustion.

Many substances used in semi-conductor device manufacturing, and which are extracted from a chamber in which such manufacturing takes place, are toxic and/or environmentally harmful and must therefore be scrubbed from the exhaust gas stream before its release in to the atmosphere.

A number of different types of wet or dry chemical scrubbing reactors have been proposed and numerous are commercially employed in the semi-conductor industry.

For example, in our Patent Specification No. WO 89/11905 there is disclosed a dry chemical reactor sold by our Edwards High Vacuum International Division comprising a heated packed tube of granular substances through which the exhaust stream is directed including in particular a first stage of silicon (with an optical addition of copper when the exhaust stream contains nitrogen trifluoride in particular) and a second stage of calcium oxide commonly in the form of lime. Such a reactor has met with considerable commercial success for the scrubbing of such toxic substances.

It is also known from European Patent Specification No 694 735 in the name of Alzeta Corporation, the contents of which are incorporated herein by reference, that noxious substances of the type in question can be removed from exhaust streams by combustion.

There is described in this prior Specification a process for the combustive destruction of noxious substances which comprises injecting an exhaust gas and added fuel gas in to a combustion zone that is laterally surrounded by the exit surface of a foraminous gas burner, simultaneously supplying fuel gas and air to the burner to effect combustion at the exit surface, the amount of the fuel gas supplied to the foraminous gas burner being on a BTU basis, greater than that of the added fuel gas, and the amount of the air being in excess of the stoichiometric requirement of all the combustibles entering the combustion zone, and discharging the remitting combustion product stream from the combustion zone.

A central feature of the prior combustive process is the critical need to supply the fuel gas admixed with the exhaust gas stream in to the combustion zone of the burner. Such premixing of the fuel gas and exhaust gas stream allows for a much greater and efficient scrubbing of the perfluorocarbon hexafluoroethane ($C_2F_6$). However, there remains certain problems associated with the scrubbing of the even more stable perfluorocarbon tetrafluoromethane ($CF_4$).

A great advantage of the prior combustive scrubbing process described above is that it inherently limits the maximum temperature that can be attained in the combustion chamber and thereby suppress the formation of $NO_x$ gas by-products that may otherwise be formed.

However, the relatively low maximum temperature may become a limiting factor in the destruction of the most stable perfluorocarbon gases, in particular tetrafluoromethane ($CF_4$).

SUMMARY OF THE INVENTION

It has now been found that an addition of oxygen to the exhaust gas stream prior to the introduction of the gas stream in to a foraminous gas burner generally allows for a more efficient combustion of perfluorocarbon gases including tetrafluoromethane ($CF_4$).

In accordance with the invention, there is provided a process for the combustive destruction of noxious substances from a gas stream, which comprises injecting the gas stream and added fuel gas as a mixture in to a combustion zone that is surrounded by an exit surface of a foraminous gas burner and simultaneously supplying a fuel gas and air/oxygen mixture to the foraminous gas burner to effect combustion at the exit surface, and discharging the resulting combustion product stream from the combustion zone, wherein oxygen is added to the gas stream and the fuel gas prior to the introduction of the mixture to the combustion zone and wherein the oxygen/fuel gas mixture burns at the point of injection.

In general, the oxygen and the fuel gas should be mixed immediately prior to the introduction of the mixture in to the combustion zone.

This allows the burning of the mixture to be maximized but with a reduced potential for a "flash back". Preferably, the mixing is effected in a pipe or pipes at the end of which a nozzle or nozzles effects the introduction of the mixture towards the combustion zone and on which the burning occurs. Preferably, however, only one such nozzle is present.

Preferably the amount of oxygen added to the gas stream and fuel gas is such that the oxygen concentration of the total gas stream injected into the combustion zone is from about 10 to about 40% by volume, most preferably from about 15 to about 25% by volume.

Preferably also the fuel gas concentration of the gas stream entering the combustion zone is from about 80 to about 150% of the stoichiometric amount needed for combustion by the oxygen added to the gas stream.

It is important that both the fuel gas and the oxygen are introduced in to the gas stream prior to the stream being injected in to the combustion zone.

With regard to the oxygen, this is preferably introduced to the exhaust gas stream by way of an oxygen lance. Preferably a nozzle of such a lance is positioned within or in a pipe carrying the exhaust stream immediately prior to the point of injection of the gas stream in to the combustion zone.

Advantageously, the oxygen lance comprises a concentric tube within the pipe carrying the gas stream. Advantageously also, the oxygen nozzle is positioned between about 0.7 and about 3 pipe internal diameters prior to the point of injection of the gas stream in to the combustion zone.

With regard to the fuel gas, this can be added to the gas stream at any convenient point prior to its entry in to the combustion zone. However, for reasons of potential flammability in particular, both oxygen and fuel gas should not be present for any appreciable time prior to their co-injection in to the combustion zone. If the oxygen is added to the gas stream upstream of the preferred embodiments described above and generally, it is preferably that the fuel gas is introduced in to the gas stream by means of a gas nozzle that terminates within or on the pipe carrying the exhaust stream and positioned between about 0.7 and about 3 pipe diameters prior to the point of injection of the exhaust stream in to the combustion zone.

The fuel gas added to the gas stream (or used in the foraminous burner operation) is preferably carbon-based, for example methane, propane or butane or at least a mixture containing predominantly methane, propane or butane. Alternatively, it may be hydrogen. The fuel gas for the gas stream and for the burner are preferably the same but may be different if appropriate.

The mixture fed to the foraminous burner is preferably a fuel gas and air mixture. In general, the mixture should preferably have a 10 to 80% stoichiometric excess of air over the fuel gas.

BRIEF DESCRIPTION OF THE DRAWINGS

For a better understanding of the invention, reference will now be made, by way of exemplification only, to the accompanying drawing which shows schematically a furnace with gas inlets for use in the process of the invention.

DETAILED DESCRIPTION

The drawing shows a furnace of the same general type as described in European Specification No. 694 735, and FIG. 3 thereof in particular. The furnace comprises a substantially cylindrical steel shell 1 having a top plate 2 from which depends a cylindrical screen 3 made from a supported adherent porous layer of ceramic matrix and/or metal fibres to form a foraminous burner 4 again of the same general type as described in European Specification No. 694 735.

A plenum volume 5 is therefore formed between the shell 1 and the screen 3 (and closed by the top plate 2 and a lower annular plate 6) in to which a fuel gas/air mixture can be fed via one or more inlet nozzles 7 to feed the combustion zone of the foraminous burner, a flame being formed in use on the internal surface of the screen.

The top plate 2 sealingly houses a plurality of pipes 8 for introduction in to the burner 4 of the exhaust gas stream admixed prior to its introduction with the fuel gas and oxygen.

Introduction of oxygen is effected from a source of oxygen ($O_2$) by means of oxygen lances 9 which are concentrically positioned within the pipes 8 and which have nozzles 10 which can introduce the oxygen gas in to the pipes 8; the nozzles 10 are situated at twice the diameter of the pipes 8 from the point of injection 11 of the exhaust gas stream in to the burner 4.

Introduction of methane as the fuel gas in to the gas stream in this example is effected upstream of the oxygen introduction in to the gas stream and is fed in to the pipes 8 from a source 12 via a pipe system 13.

To exemplify the use of a process of the invention in conjunction with the type of furnace shown in the drawing, a fuel gas/air mixture was supplied to the plenum volume 5 and, after diffusing through the screen 3, was ignited on the inner surface of the screen 3, ie within the foraminous burner 4.

An exhaust gas stream to be scrubbed was mixed with fuel gas upstream of the burner and with oxygen prior to its introduction to the burner 4 in the manner described above with reference to the drawing.

The Table shows the results of various tests to scrub a perfluorocarbon (PFC) gas from a gas stream comprising the perfluorocarbon in a nitrogen carrier gas, the perfluorocarbon being one of tetrafluoromethane ($CF_4$), sulphur hexafluoride ($SF_4$), nitrogen trifluoride ($NF_3$) and hexafluoroethane ($C_4F_6$), with varying amounts of methane ($CH_4$) as fuel gas and oxygen added to the gas stream in accordance with the invention.

TABLE

| Test No. | PFC Gas | $CH_4$ Flow (slpm)* | $N_2$ Flow (slpm)* | PFC Flow (slpm)* | $O_2$ Flow (slpm)* | % Destruction |
|---|---|---|---|---|---|---|
| 1 | $CF_4$ | 0 | 50 | 1 | 0 | 0 |
| 2 | $CF_4$ | 9 | 50 | 1 | 0 | 0 |
| 3 | $CF_4$ | 0 | 50 | 1 | 14 | 0 |
| 4 | $CF_4$ | 9 | 50 | 1 | 14 | 95 |
| 5 | $SF_6$ | 0 | 50 | 1 | 0 | 0 |
| 6 | $SF_6$ | 9 | 50 | 1 | 0 | 45 |
| 7 | $SF_6$ | 9 | 50 | 1 | 14 | 100 |
| 8 | $NF_3$ | 0 | 50 | 1 | 0 | 69 |
| 9 | $NF_3$ | 6 | 50 | 1 | 10 | 100 |
| 10 | $C_2F_6$ | 0 | 50 | 1.6 | 0 | 0 |
| 11 | $C_2F_6$ | 9 | 50 | 1.6 | 0 | 54 |
| 12 | $C_2F_6$ | 9 | 50 | 1.6 | 14 | 100 |

The results shown in the Table confirm that with each of tetrafluoromethane ($CF_4$), sulphur hexafluoride ($SF_6$), nitrogen trifluoride ($NF_3$) and hexafluoroethane ($C_2F_6$), a level of destruction of these noxious substances from a nitrogen gas stream of at least about 95% was achieved only with a combined presence in the gas stream of both a fuel gas methane ($CF_4$), and oxygen prior to the introduction of the gas stream in to the burner. This confirms in particular the usefulness of the invention in scrubbing the most stable of the PFC gases, tetrafluoromethane.

The successful tests all had an oxygen concentration in the gas stream of about 20% and a fuel gas (methane) concentration of about 130% of the stoichiometric amount required for the oxygen added to the gas stream (the latter figure being based on two oxygen molecules being required for each methane molecule for a stoichiometric burn).

We claim:

1. A process for the combustive destruction of noxious substances from an exhaust gas stream comprising:

injecting the exhaust gas stream and added fuel gas as a mixture into a combustion zone that is surrounded by an exit surface of a foraminous gas burner and simultaneously supplying a fuel gas and air/oxygen mixture to the foraminous gas burner to effect combustion at the exit surface;

discharging the resulting combustion product stream from the combustion zone;

oxygen being added to the exhaust gas stream and the fuel gas prior to the introduction of the exhaust gas stream and fuel gas mixture to the combustion zone and the oxygen/fuel gas mixture burning at the point of injection.

2. The process according to claim 1 in which the amount of oxygen added to the exhaust gas stream and the fuel gas is such that the oxygen concentration of the exhaust gas stream and fuel gas mixture injected into the combustion zone is in a range of between about 10 and about 40% by volume.

3. The process according to claim 2 in which the amount of oxygen added to the exhaust gas stream and the fuel gas is such that the oxygen concentration of the exhaust gas stream and fuel gas mixture injected into the combustion zone is in a range of between about 15 and about 25%.

4. The process according to claim 1 in which the fuel gas concentration of the exhaust gas stream and fuel gas mixture entering the combustion zone is in a range of between about 80 and about 150% of the stoichiometric amount needed for combustion by the oxygen added to the exhaust gas stream and fuel gas mixture.

5. The process according to claim 1 in which oxygen is added to the exhaust gas stream by means of an oxygen lance.

6. The process according to claim 5 in which the oxygen lance nozzle is positioned within or on a pipe carrying the exhaust stream immediately prior to the point of injection of the exhaust stream in to the combustion zone.

7. The process according to claim 6 in which the oxygen nozzle is positioned in a range of between about 0.7 and about 3 pipe internal diameters prior to the point of injection of the exhaust stream in to the combustion zone.

8. The process according to claim 6 in which the fuel gas is introduced in to the exhaust gas stream by means of a gas nozzle that terminates within or on the pipe carrying the exhaust stream and positioned in a range of between about 0.7 and about 3 pipe diameters prior to the point of injection of the exhaust stream in to the combustion zone.

9. The process according to claim 1 in which the exhaust stream comprises at least one noxious substance in a nitrogen carrier gas.

10. The process according to claim 1 in which the fuel gas of the mixtures is a hydrocarbon.

11. The process according to claim 9 in which the fuel gas is one of methane, propane and butane.

* * * * *